US008784213B2

(12) United States Patent
Johnson

(10) Patent No.: US 8,784,213 B2
(45) Date of Patent: Jul. 22, 2014

(54) ENHANCED VIDEO GAMING MACHINE

(75) Inventor: Sam Johnson, Suwanee, GA (US)

(73) Assignee: Tipping Point Group, Las Vegas, NV (US)

( * ) Notice: Subject to any disclaimer, the term of this patent is extended or adjusted under 35 U.S.C. 154(b) by 702 days.

(21) Appl. No.: 11/968,633

(22) Filed: Jan. 2, 2008

(65) Prior Publication Data

US 2008/0161107 A1 Jul. 3, 2008

Related U.S. Application Data

(63) Continuation of application No. 10/689,407, filed on Oct. 20, 2003, now Pat. No. 7,335,106.

(51) Int. Cl.
*A63F 13/00* (2014.01)

(52) U.S. Cl.
USPC .................. 463/42; 463/16; 463/20; 463/25; 463/29; 463/31; 463/39; 463/40; 463/43

(58) Field of Classification Search
USPC ....................... 463/16–20, 25, 39–43, 29, 33
See application file for complete search history.

(56) References Cited

U.S. PATENT DOCUMENTS

| | | | |
|---|---|---|---|
| 4,004,097 | A | 1/1977 | Spaulding |
| 4,261,012 | A | 4/1981 | Maloomian |
| 4,357,624 | A | 11/1982 | Greenberg |
| 4,503,429 | A | 3/1985 | Schreiber |
| 4,521,014 | A | 6/1985 | Sitrick |
| 4,527,798 | A | 7/1985 | Siekierski et al. |
| 4,694,490 | A | 9/1987 | Harvey et al. |
| 4,704,725 | A | 11/1987 | Harvey et al. |
| 4,710,873 | A | 12/1987 | Breslow et al. |
| 4,743,022 | A | 5/1988 | Wood |
| 4,926,327 | A | 5/1990 | Sidley |
| 4,965,825 | A | 10/1990 | Harvey et al. |

(Continued)

FOREIGN PATENT DOCUMENTS

| | | |
|---|---|---|
| EP | 0946028 | 9/1999 |
| WO | WO 02/055163 | 7/2002 |

(Continued)

OTHER PUBLICATIONS

Jon Lafayette, Adds on VOD Seen as Counter to Skipping, tvweek.com, www.tvweek.com/article.cms?articleID=26175, Oct. 4, 2004.

(Continued)

*Primary Examiner* — Sunit Pandya
(74) *Attorney, Agent, or Firm* — Weide & Miller, Ltd.

(57) ABSTRACT

The present invention provides a closed-loop system that allows the operator of video gaming machines or other systems to define promotional events for the particular machines or systems, monitor the activity of the particular machines or systems, and grant awards. More specifically, the promotional events may include scheduling information, winning criteria and awards. During the period of time that the promotional event is active, the activity of the machine or system is monitored to determine if the winning criteria has been satisfied. If the winning criteria are satisfied, information pertaining to event is recorded. The present invention is applicable to a variety of embodiments including video poker machines, black jack machines or other gaming and gambling machines, as well as other systems that include a display mechanism and an activity that can be monitored.

11 Claims, 6 Drawing Sheets

(56) References Cited

U.S. PATENT DOCUMENTS

| | | | | |
|---|---|---|---|---|
| 5,105,184 | A | 4/1992 | Pirani et al. | |
| 5,121,477 | A | 6/1992 | Koopmans et al. | |
| 5,233,423 | A | 8/1993 | Jernigan et al. | |
| 5,429,361 | A | 7/1995 | Raven et al. | |
| 5,470,079 | A | 11/1995 | LeStrange et al. | |
| 5,477,952 | A | 12/1995 | Castellano et al. | |
| 5,531,441 | A | 7/1996 | Dabrowski et al. | |
| 5,553,864 | A | 9/1996 | Sitrick | |
| 5,559,312 | A | 9/1996 | Lucero | |
| 5,586,936 | A | 12/1996 | Bennett et al. | |
| 5,613,912 | A | 3/1997 | Slater | |
| 5,655,961 | A | 8/1997 | Acres et al. | |
| 5,678,679 | A | 10/1997 | Berman | |
| 5,740,549 | A | 4/1998 | Reilly et al. | |
| 5,761,647 | A | 6/1998 | Boushy | |
| 5,774,873 | A | 6/1998 | Berent et al. | |
| 5,785,592 | A | 7/1998 | Jacobsen | |
| 5,813,912 | A | 9/1998 | Shultz | |
| 5,816,918 | A | 10/1998 | Kelly et al. | |
| 5,830,065 | A | 11/1998 | Sitrick | |
| 5,887,243 | A | 5/1999 | Grossman et al. | |
| 5,907,321 | A | 5/1999 | Grossman et al. | |
| 5,919,090 | A | 7/1999 | Mothwurf | |
| 5,941,772 | A | 8/1999 | Paige | |
| 5,971,271 | A | 10/1999 | Wynn et al. | |
| 5,990,927 | A | 11/1999 | Hendricks et al. | |
| 6,003,013 | A | 12/1999 | Boushy et al. | |
| 6,012,832 | A | 1/2000 | Saunders et al. | |
| 6,015,344 | A | 1/2000 | Kelly et al. | |
| 6,036,601 | A * | 3/2000 | Heckel | 463/42 |
| 6,049,823 | A | 4/2000 | Hwang | |
| 6,068,552 | A | 5/2000 | Walker et al. | |
| 6,089,975 | A | 7/2000 | Dunn | |
| 6,113,495 | A | 9/2000 | Walker et al. | |
| 6,142,876 | A | 11/2000 | Cumbers | |
| 6,175,358 | B1 | 1/2001 | Scott-Jackson et al. | |
| 6,186,893 | B1 * | 2/2001 | Walker et al. | 463/20 |
| 6,203,428 | B1 | 3/2001 | Giobbi et al. | |
| 6,234,900 | B1 | 5/2001 | Cumbers | |
| 6,244,957 | B1 | 6/2001 | Walker et al. | |
| 6,251,014 | B1 | 6/2001 | Stockdale et al. | |
| 6,253,119 | B1 | 6/2001 | Dabrowski | |
| 6,263,258 | B1 | 7/2001 | Dabrowski | |
| 6,280,318 | B1 | 8/2001 | Criss-Puszkiewicz | |
| 6,280,326 | B1 | 8/2001 | Saunders | |
| 6,302,793 | B1 | 10/2001 | Fertitta, III et al. | |
| 6,315,666 | B1 | 11/2001 | Mastera et al. | |
| 6,368,216 | B1 | 4/2002 | Hedrick et al. | |
| 6,375,567 | B1 | 4/2002 | Acres | |
| 6,379,246 | B1 | 4/2002 | Dabrowski | |
| 6,379,247 | B1 | 4/2002 | Walker et al. | |
| 6,390,917 | B1 | 5/2002 | Walker et al. | |
| 6,425,825 | B1 | 7/2002 | Sitrick | |
| 6,443,456 | B1 | 9/2002 | Gajor | |
| 6,459,440 | B1 | 10/2002 | Monnes et al. | |
| 6,460,848 | B1 | 10/2002 | Soltys et al. | |
| 6,500,067 | B1 | 12/2002 | Luciano et al. | |
| 6,503,147 | B1 | 1/2003 | Stockdale et al. | |
| 6,508,710 | B1 | 1/2003 | Paravia et al. | |
| 6,517,435 | B2 | 2/2003 | Soltys et al. | |
| 6,517,436 | B2 | 2/2003 | Soltys et al. | |
| 6,520,857 | B2 | 2/2003 | Soltys et al. | |
| 6,527,271 | B2 | 3/2003 | Soltys et al. | |
| 6,530,836 | B2 | 3/2003 | Soltys et al. | |
| 6,530,837 | B2 | 3/2003 | Soltys et al. | |
| 6,533,276 | B2 | 3/2003 | Soltys et al. | |
| 6,533,662 | B2 | 3/2003 | Soltys et al. | |
| 6,540,609 | B1 | 4/2003 | Paige | |
| 6,579,179 | B2 | 6/2003 | Poole et al. | |
| 6,579,180 | B2 | 6/2003 | Soltys et al. | |
| 6,579,181 | B2 | 6/2003 | Soltys et al. | |
| 6,582,310 | B1 | 6/2003 | Walker et al. | |
| 6,592,456 | B2 | 7/2003 | Walker et al. | |
| 6,595,857 | B2 | 7/2003 | Soltys et al. | |
| 6,598,788 | B1 | 7/2003 | Dabrowski | |
| 6,620,046 | B2 | 9/2003 | Rowe | |
| 6,638,163 | B2 | 10/2003 | Moody | |
| 6,641,483 | B1 | 11/2003 | Luciano | |
| 6,645,068 | B1 | 11/2003 | Kelly et al. | |
| 6,648,757 | B1 | 11/2003 | Slomiany et al. | |
| 6,652,378 | B2 * | 11/2003 | Cannon et al. | 463/20 |
| 6,652,380 | B1 | 11/2003 | Luciano | |
| 6,663,490 | B2 | 12/2003 | Soltys et al. | |
| 6,672,589 | B1 | 1/2004 | Lemke et al. | |
| 6,676,515 | B1 | 1/2004 | Baltz et al. | |
| 6,679,775 | B1 | 1/2004 | Luciano et al. | |
| 6,682,423 | B2 | 1/2004 | Brosnan et al. | |
| 6,685,559 | B2 | 2/2004 | Luciano et al. | |
| 6,712,696 | B2 | 3/2004 | Soltys et al. | |
| 6,712,698 | B2 | 3/2004 | Paulsen et al. | |
| 6,722,978 | B2 | 4/2004 | Valenti | |
| 6,729,956 | B2 | 5/2004 | Wolf et al. | |
| 6,743,095 | B2 | 6/2004 | Cole et al. | |
| 6,749,510 | B2 | 6/2004 | Giobbi | |
| 6,758,751 | B2 | 7/2004 | Soltys et al. | |
| 6,800,029 | B2 | 10/2004 | Rowe et al. | |
| 6,843,723 | B2 | 1/2005 | Joshi | |
| 6,848,995 | B1 | 2/2005 | Walker et al. | |
| 6,852,029 | B2 | 2/2005 | Baltz et al. | |
| 6,863,611 | B1 | 3/2005 | Morrow et al. | |
| 6,884,174 | B2 | 4/2005 | Lundy et al. | |
| 6,890,256 | B2 | 5/2005 | Walker et al. | |
| 6,896,618 | B2 | 5/2005 | Benoy et al. | |
| 6,908,384 | B1 | 6/2005 | Luciano, Jr. | |
| 6,916,246 | B1 | 7/2005 | Luciano, Jr. | |
| 6,924,903 | B2 | 8/2005 | Brooks et al. | |
| 6,935,946 | B2 | 8/2005 | Yoseloff | |
| 6,942,574 | B1 | 9/2005 | LeMay et al. | |
| 6,958,014 | B1 | 10/2005 | Luciano, Jr. et al. | |
| 6,984,174 | B2 | 1/2006 | Cannon et al. | |
| 6,991,543 | B2 | 1/2006 | Joshi | |
| 7,004,837 | B1 | 2/2006 | Crowder, Jr. et al. | |
| 7,022,017 | B1 | 4/2006 | Halbritter et al. | |
| 7,025,676 | B2 | 4/2006 | Cole et al. | |
| 7,063,617 | B2 | 6/2006 | Brosnan et al. | |
| 7,070,503 | B2 | 7/2006 | Rudolph | |
| 7,094,149 | B2 | 8/2006 | Walker et al. | |
| 7,112,138 | B2 | 9/2006 | Hedrick et al. | |
| 7,118,478 | B2 | 10/2006 | Fayter et al. | |
| 7,137,889 | B1 | 11/2006 | Luciano | |
| 7,137,892 | B2 | 11/2006 | Sitrick | |
| 7,241,219 | B2 | 7/2007 | Walker et al. | |
| 7,255,351 | B2 | 8/2007 | Yoseloff et al. | |
| 7,285,049 | B1 | 10/2007 | Luciano, Jr. et al. | |
| 7,290,072 | B2 | 10/2007 | Quraishi et al. | |
| 7,297,062 | B2 | 11/2007 | Gatto et al. | |
| 7,322,885 | B1 | 1/2008 | Luciano, Jr. et al. | |
| 7,335,106 | B2 | 2/2008 | Johnson | |
| 7,357,714 | B2 | 4/2008 | Tessmer et al. | |
| 7,392,470 | B2 | 6/2008 | Kammler | |
| 7,473,179 | B2 | 1/2009 | Xidos et al. | |
| 7,520,810 | B2 | 4/2009 | Dabrowski | |
| 7,674,177 | B2 | 3/2010 | Cole et al. | |
| 7,704,147 | B2 | 4/2010 | Quraishi et al. | |
| 7,771,271 | B2 | 8/2010 | Walker et al. | |
| 7,819,750 | B2 | 10/2010 | Lam et al. | |
| 7,827,488 | B2 | 11/2010 | Sitrick | |
| 7,867,086 | B2 | 1/2011 | Sitrick | |
| 8,133,102 | B2 | 3/2012 | Dabrowski | |
| 8,512,144 | B2 | 8/2013 | Johnson et al. | |
| 8,585,479 | B2 | 11/2013 | Ryan et al. | |
| 2002/0016202 | A1 | 2/2002 | Fertitta et al. | |
| 2002/0025850 | A1 | 2/2002 | Hafezi | |
| 2002/0142841 | A1 | 10/2002 | Boushy | |
| 2002/0147047 | A1 | 10/2002 | Letovsky et al. | |
| 2002/0155891 | A1 * | 10/2002 | Okada et al. | 463/42 |
| 2002/0169021 | A1 | 11/2002 | Urie et al. | |
| 2002/0177479 | A1 | 11/2002 | Walker et al. | |
| 2002/0177480 | A1 | 11/2002 | Rowe | |
| 2002/0198044 | A1 | 12/2002 | Walker et al. | |
| 2003/0004871 | A1 | 1/2003 | Rowe | |
| 2003/0013512 | A1 | 1/2003 | Rowe | |
| 2003/0013513 | A1 | 1/2003 | Rowe | |
| 2003/0013516 | A1 | 1/2003 | Walker et al. | |

(56) References Cited

U.S. PATENT DOCUMENTS

| | | | |
|---|---|---|---|
| 2003/0013527 | A1 | 1/2003 | Rowe et al. |
| 2003/0027631 | A1 | 2/2003 | Hedrick et al. |
| 2003/0032474 | A1 | 2/2003 | Kaminkow |
| 2003/0036425 | A1 | 2/2003 | Kaminkow et al. |
| 2003/0054868 | A1 | 3/2003 | Paulsen et al. |
| 2003/0054880 | A1 | 3/2003 | Lam et al. |
| 2003/0054881 | A1 | 3/2003 | Hedrick et al. |
| 2003/0064800 | A1 | 4/2003 | Jackson et al. |
| 2003/0083943 | A1 * | 5/2003 | Adams et al. .................. 705/14 |
| 2003/0096645 | A1 | 5/2003 | Soltys et al. |
| 2003/0100359 | A1 | 5/2003 | Loose et al. |
| 2003/0119579 | A1 | 6/2003 | Walker et al. |
| 2003/0139214 | A1 | 7/2003 | Wolf et al. |
| 2003/0149619 | A1 | 8/2003 | Stanley et al. |
| 2003/0162588 | A1 | 8/2003 | Brosnan et al. |
| 2003/0187736 | A1 | 10/2003 | Teague et al. |
| 2003/0195036 | A1 | 10/2003 | Poole et al. |
| 2003/0207711 | A1 | 11/2003 | Rowe |
| 2003/0216169 | A1 | 11/2003 | Walker et al. |
| 2003/0216966 | A1 | 11/2003 | Saenz et al. |
| 2003/0232647 | A1 | 12/2003 | Moser |
| 2004/0024608 | A1 | 2/2004 | Saenz et al. |
| 2004/0032086 | A1 | 2/2004 | Barragan |
| 2004/0038735 | A1 | 2/2004 | Steil |
| 2004/0039679 | A1 | 2/2004 | Norton et al. |
| 2004/0039695 | A1 | 2/2004 | Rowe |
| 2004/0043814 | A1 | 3/2004 | Angell et al. |
| 2004/0053663 | A1 | 3/2004 | Paulsen |
| 2004/0077408 | A1 | 4/2004 | D'Amico et al. |
| 2004/0092303 | A1 | 5/2004 | George et al. |
| 2004/0092315 | A1 | 5/2004 | Boyd et al. |
| 2004/0106449 | A1 | 6/2004 | Walker et al. |
| 2004/0113360 | A1 | 6/2004 | George et al. |
| 2004/0127284 | A1 | 7/2004 | Walker et al. |
| 2004/0132531 | A1 | 7/2004 | George et al. |
| 2004/0132532 | A1 | 7/2004 | Brosnan et al. |
| 2004/0142739 | A1 | 7/2004 | Loose et al. |
| 2004/0143496 | A1 | 7/2004 | Saenz |
| 2004/0209674 | A1 | 10/2004 | Conover et al. |
| 2004/0214622 | A1 | 10/2004 | Atkinson |
| 2004/0219975 | A1 | 11/2004 | Soltys et al. |
| 2004/0254006 | A1 | 12/2004 | Lam et al. |
| 2004/0254009 | A1 | 12/2004 | D'Amico et al. |
| 2004/0254013 | A1 | 12/2004 | Quraishi et al. |
| 2004/0254014 | A1 | 12/2004 | Quraishi et al. |
| 2005/0003890 | A1 | 1/2005 | Hedrick et al. |
| 2005/0009600 | A1 | 1/2005 | Rowe et al. |
| 2005/0013527 | A1 | 1/2005 | Doyle et al. |
| 2005/0014558 | A1 | 1/2005 | Estey |
| 2005/0027381 | A1 | 2/2005 | George et al. |
| 2005/0032575 | A1 | 2/2005 | Goforth et al. |
| 2005/0037837 | A1 | 2/2005 | Rowe |
| 2005/0054439 | A1 | 3/2005 | Rowe et al. |
| 2005/0054446 | A1 | 3/2005 | Kammler et al. |
| 2005/0059457 | A1 | 3/2005 | Rothschild et al. |
| 2005/0059480 | A1 | 3/2005 | Soukup et al. |
| 2005/0059485 | A1 | 3/2005 | Paulsen et al. |
| 2005/0075165 | A1 | 4/2005 | George et al. |
| 2005/0075889 | A1 | 4/2005 | Gomes et al. |
| 2005/0085300 | A1 | 4/2005 | Johnson |
| 2005/0096112 | A1 | 5/2005 | Guinn, Jr. et al. |
| 2005/0096129 | A1 | 5/2005 | Walker et al. |
| 2005/0119044 | A1 | 6/2005 | Lim et al. |
| 2005/0119048 | A1 | 6/2005 | Soltys et al. |
| 2005/0119052 | A1 | 6/2005 | Russell et al. |
| 2005/0137011 | A1 | 6/2005 | Walker et al. |
| 2005/0143166 | A1 | 6/2005 | Walker et al. |
| 2005/0153768 | A1 | 7/2005 | Paulsen |
| 2005/0153773 | A1 | 7/2005 | Nguyen et al. |
| 2005/0170883 | A1 | 8/2005 | Muskin |
| 2005/0170892 | A1 | 8/2005 | Atkinson |
| 2005/0171808 | A1 | 8/2005 | Saenz et al. |
| 2005/0182647 | A1 | 8/2005 | Saenz et al. |
| 2005/0187012 | A1 | 8/2005 | Walker et al. |
| 2005/0197183 | A1 | 9/2005 | Walker et al. |
| 2005/0215310 | A1 | 9/2005 | Boyd et al. |
| 2005/0215316 | A1 | 9/2005 | Rowe et al. |
| 2006/0019747 | A1 | 1/2006 | Loose et al. |
| 2006/0025206 | A1 | 2/2006 | Walker et al. |
| 2006/0046819 | A1 | 3/2006 | Nguyen et al. |
| 2006/0068906 | A1 | 3/2006 | Morrow et al. |
| 2006/0073870 | A1 | 4/2006 | Cannon |
| 2006/0084488 | A1 | 4/2006 | Kinsley et al. |
| 2006/0135230 | A1 | 6/2006 | Godse et al. |
| 2006/0135255 | A1 | 6/2006 | Roth |
| 2006/0154719 | A1 | 7/2006 | Okuniewicz |
| 2006/0154721 | A1 | 7/2006 | Okuniewicz |
| 2006/0178208 | A1 | 8/2006 | Cole |
| 2006/0211477 | A1 | 9/2006 | Walker et al. |
| 2006/0247027 | A1 | 11/2006 | Walker et al. |
| 2006/0252504 | A1 | 11/2006 | Walker et al. |
| 2006/0252505 | A1 | 11/2006 | Walker et al. |
| 2006/0287063 | A1 | 12/2006 | Walker et al. |
| 2007/0015569 | A1 | 1/2007 | Norton et al. |
| 2007/0105617 | A1 | 5/2007 | Walker et al. |
| 2007/0121936 | A1 | 5/2007 | Guillou et al. |
| 2007/0129137 | A1 | 6/2007 | Walker et al. |
| 2007/0213124 | A1 | 9/2007 | Walker et al. |
| 2007/0259709 | A1 | 11/2007 | Kelly et al. |
| 2007/0265060 | A1 | 11/2007 | Hornik et al. |
| 2008/0009344 | A1 | 1/2008 | Graham et al. |
| 2008/0026816 | A1 | 1/2008 | Sammon et al. |
| 2008/0039190 | A1 | 2/2008 | Walker et al. |
| 2009/0291736 | A1 | 11/2009 | Walker et al. |

FOREIGN PATENT DOCUMENTS

| | | |
|---|---|---|
| WO | WO 03/089082 | 10/2003 |
| WO | WO 03/093986 | 11/2003 |
| WO | WO 2005/070509 | 8/2005 |
| WO | 2005/099839 | 10/2005 |

OTHER PUBLICATIONS

James R. Hagarty, Judge's Ruling on Pop-Up Ads is a Blow to Web-Site Operators, Wall Street Journal, Monday Sep. 8, 2003, p. A3 and A5.

Michael McCarthy, Ads are here, there everywhere, USA Today, Jun. 19, 2001.

Terry Lefton, Playing the Ad Market, The Industry Standard, Jul. 30, 2001.

Daisy Whitney, A 'TiVo-Proof' Ad Model, Vision Week, May 7, 2004.

Curt Rist, Should you ad go here?, http://money.cnn.com/2004/03/04/technology/business2_adds/.

Jack Myers, Ourdoor Sets Sites on Doubling Share-of-Market with Research & Tech Upgrades, Jack Myers Report, Mar. 3, 2004.

* cited by examiner

FIG. 4
Slot 1
Available AdLiner
Slot 2
BBQ
BBQ Brisket Cheddar Melt $6.99
Slot 3
Applebee's
Order Applebee's Gift Certificates Today
It's The Gift of Good Taste!
Slot 4
Applebee's
Try Our Delicious Onion Peels Served
with a Creamy Horseradish Dipping Sauce.
Slot 5
Available AdLiner
Slot 6
BBQ
BBQ Stack Steak $6.99
Slot 7
Hit this hand between 5-7PM
WIN 10,000 Bonus Points
Slot 8
Available AdLiner
Slot 9
Available AdLiner
Slot 10
Available AdLiner
1 2 3 4 5 6

ENHANCED VIDEO GAMING MACHINE

CROSS-REFERENCE TO RELATED APPLICATIONS

This application is a continuation application of, and claims priority to, U.S. patent application Ser. No. 10/689,407 filed on Oct. 20, 2003 now U.S. Pat. No. 7,335,106.

FIELD OF THE INVENTION

The present invention relates generally to the electronic video gaming industry and, more particularly to providing a closed-loop system that allows an operator of an electronic gaming system to create customized promotional events, display the promotional events on the video display of the electronic video game, monitor the activity of the electronic video game to determine if a player has earned an award, and then grant any earned awards to the player.

BACKGROUND OF THE INVENTION

Electronic video games have come along way. In the early days, the Odyssey system allowed a user to tape one of several plastic see-through diagrams onto their television screen. Various diagrams were available, such as basketball, hockey, football and pong. However, the underlying game was the same—it was just a variation of the original Pong game. Today, highly complex, nearly real-life graphics are available and the game controllers have more buttons than the most advanced combined remote controls for televisions. The gambling gaming industry has capitalized on this growth. The standard mechanical slot machines of yesterday have converged with the growth in the electronic video gaming industry to introduce a new line of electronic video games. Some of the more popular outgrowths of this convergence are the video poker, black jack and video slot machines.

The gambling gaming industry has also capitalized on applying the growth in networking technology. Today, the electronic games are connected through a network to a main server that monitors the play of the games, the payouts awarded, and even the identity of the parties that are playing the game. The blue-haired ladies with buckets of quarters have been replaced with blue-haired ladies wearing a string around their necks that is connected to magnetic-strip identification card. The magnetic strip identification cards, in some cases simply identify the player but, in other cases operate as a pre-paid card and maintain a value based on the initial value loaded when the card is obtained, augmented by the success or failure of the user at the electronic game. Prior to commencing play, the card is swiped or entered into a slot on the machine and the identity of the player is extracted. In addition, the value loaded onto the card can be read and loaded into the machine. As play commences, the value can be decremented or incremented based on the gambling results. All of this information can be fed into the main server and recorded into a database.

One of the problems that the gambling gaming industry faces is dealing with the amount of traffic that is transmitted through the network. One technique that has been employed to reduce this traffic is to filter out all plays except for payout plays. For instance, in video poker, a payout list is provided on the display to indicate what hands will result in what payouts. Any hands that do not qualify as a payout are simply ignored. The hands that result in a payout result in a data entry being transmitted through the network to the main server. Although this technique provides a solution for reducing network traffic, it advantageously results in filtering out valuable information that could be used by the operators of the games. For instance, being able to track the number of times that a user has played the game, the frequency of starting new games, the characteristics of the user in playing the game and the reactionary speed of the players could be valuable information. Thus, there is a need in the art for a technique to capture this valuable information without over taxing the network bandwidth by introducing an abundance of network traffic.

Another disadvantage of this technique is that it limits the flexibility of the game operators in providing promotional events with the gaming machines. For instance, if an operator decides to run a promotional event in which video poker players will receive special awards for obtaining hands that are not included in the payout list, the main server has no mechanism in which to track the awards. In fact, this type of promotional event has proven to be a common technique used by video gaming machine operators to encourage play. Today these events are handled in the following manner. If an operator decides to award players with a special payback for an arbitrary hand, such as obtaining three or four clubs on Saint Patrick's day for video poker, or having a total of five on a black jack hand on Cinco De Mayo, or other non-standard hands, the operator announces the promotion either via an audio announcement, posters or a marquee that is visible to the players. If a player meets the criteria set forth in the promotion, the player approaches an employee of the casino, or the manager/bartender in a restaurant/bar setting, and gives them notice of the win. The employee or manager/bartender then serves as the sole point of contact for granting the award. It should be quite apparent that such a system is very vulnerable to "foul-play". One extra-generous bartender trying to help out a friend or impress an attractive lady can easily falsify records and grant the awards to undeserving parties.

Such promotional events have proven to be very beneficial to gambling machine operators; however, the lack of control in granting the awards results in millions of dollars being lost every year. Thus, there is a need in the art for technique that allows gambling machine operators to reap the benefits of providing promotional events while minimizing the risk of loss associated with the payout of awards for these events.

SUMMARY OF THE INVENTION

The present invention provides a closed-loop system for defining, monitoring and awarding promotional events in a variety of settings. In one embodiment, the invention includes a device that can be embedded within, or operate in conjunction with a video gaming machine. In this embodiment, the present invention operates to augment the display of a video gaming machine to provide the display of entertainment feeds, such as television, pay-per-view movies and advertisements, as well as provide for the display of information pertaining to promotional events. In addition, the present invention allows operators of the video gaming machines to customize the display of the video gaming machine and to program the types, durations and awards associated with promotional events. The closed-loop operation allows for the display of promotional events on the screen of the video gaming machine, the monitoring the activity of the video gaming machine and the recording of information indicating that an award for a promotional event has been earned. Advantageously, the present invention enables an operator to track demographic information pertaining to the play of a particular video gaming machine including, but not limited to, the identity of the player, the frequency of play by that player, the amounts betted by that player, the level of risk or characteristic of play of that player, the reactionary speed of the player, and player strategy.

DETAILED DESCRIPTION

The present invention includes a device that can be embedded within, or operate in conjunction with a video gaming machine. Throughout this description, a video gaming machine will refer to all kinds of gambling machines, such as video poker, black jack, roulette, Keno and slot machines, as well as typical arcade video machines. More specifically, the present invention operates to augment the display of a video gaming machine to provide the display of entertainment feeds, such as television, pay-per-view movies and advertisements, as well as provide for the display of information pertaining to promotional events. Another aspect of the present invention is a system to allow operators of the video gaming machines to customize the display of the video gaming machine and to program the types, durations and awards associated with promotional events. Yet another aspect of the present invention is a closed-loop system that allows for the display of promotional events on the screen of the video gaming machine, monitor the activity of the video gaming machine and record information indicating that an award for a promotional event has been earned. Yet another aspect of the present invention is to provide a technique for tracking demographic information pertaining to the play of a particular video gaming machine including, but not limited to, the identity of the player, the frequency of play by that player, the amounts betted by that player, the level of risk or characteristic of play of that player, the reactionary speed of the player, etc.

Advantageously, this invention will allow operators of video gaming machines to maintain control over promotional events and the granting of awards pertaining to those events, as well as extract valuable information that can be used in augmenting the play of these video gaming machines to increase profitability and increase play time.

Turning now to the figures in which like references and labels refer like elements, several embodiments of the present invention are provided.

Figure 1:
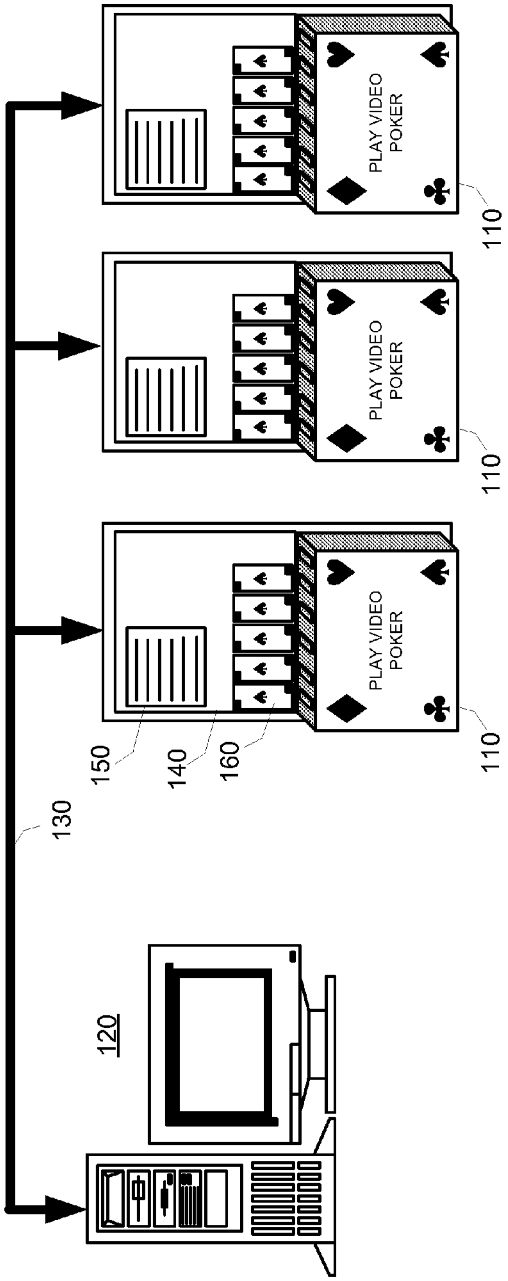
FIG. 1 PRIOR ART
FIG. 1 is a system diagram illustrating the typical interconnectivity of a video gaming machine environment.

FIG. 1 is a system diagram illustrating the typical interconnectivity of a video gaming machine environment. One or more video gaming machines 110 are connected to an operator server 120 through an operator network 130. In the illustrated environment, the video gaming machines 110 are video poker machines but it will be appreciated that other video gaming machines could likewise be connected to the same network. Typically, all of the operator's video gaming machines are connected to the operator's network and it is not necessary for the video gaming machines to be co-located or even be on the same premises. For the illustrated video poker machines, a display 140 is provided with a variety of content including a payout table 150 and a card stack 160.

In operation, each time a winning hand is obtained (i.e., one that matches a hand on the payout table), a message is sent from the video gaming machine 110 to the operator server 120 over the operator network 130 or, the information maybe stored in the video gaming machine 110 or other memory storage device and the operator server 120 can periodically request or extract the stored information. Information is extracted from this message and stored into the operator server 120. The information may include, but is not limited to, the payout hand, the time and date the hand was achieved, the identity of the machine and the identity of the player. In the more modern video gaming machines, a magnetic card reader or equivalent device is included in the video gaming machine. The magnetic card reader can be used by players to insert a card that identifies the player and/or operates as a pre-loaded cash card to enable the game to be played.

Figure 2:
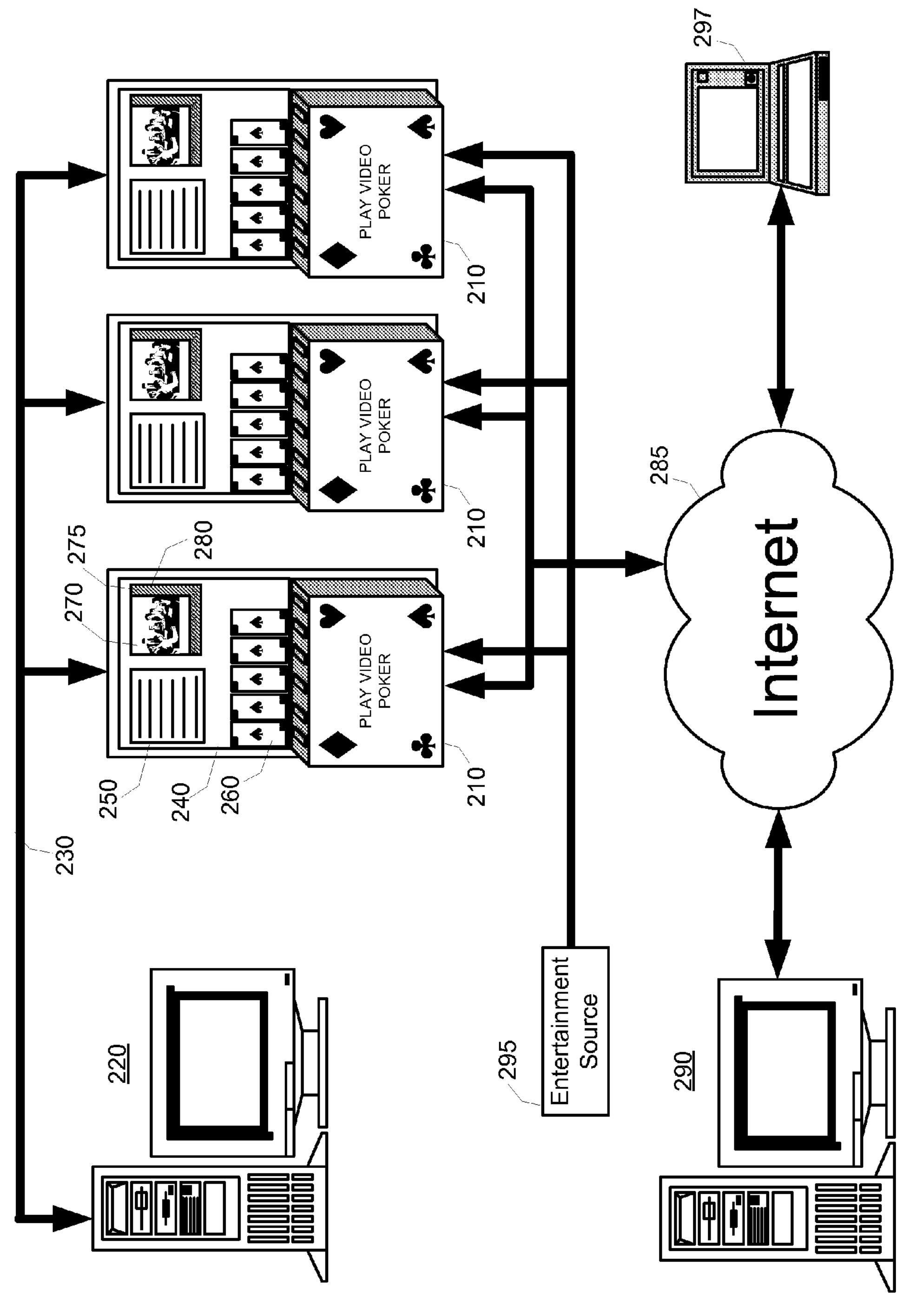
FIG. 2 is a system diagram illustrating the interconnectivity of a video gaming machine environment suitable for embodiments of the present invention.

FIG. 2 is a system diagram illustrating the interconnectivity of a video gaming machine environment suitable for embodiments of the present invention. One or more video gaming machines 210 are connected to an operator server 220 through the operator network 230. Again, in the illustrated environment, the video gaming machines 210 are video poker machines but it will be appreciated that other video gaming machines could likewise be connected to the same network. For the illustrated video poker machines, a display 240 is provided with a variety of content including a payout table 250 and a card stack 260. In addition, the present invention includes a section for the display of secondary content such as entertainment content 270 and promotional or advertising content 275. Each of the video gaming machines is equipped, either internally or externally, with a controller box 280. The controller box 280 is interconnected with a main processor or controller for the video gaming machine as well as being connected to a promotional server 290. The controller box 280 is illustrated as being connected to the promotional server 290 through a network 285 which may include the Internet, or some other public or private network. However, the promotional server 290 may connect to the controller boxes 280 through a dial-up connection, wireless connection, or dedicated lines as well. The controller boxes 280 are also connected to an entertainment source 295. The entertainment source could be a cable television feed, satellite feed, recorded information or a variety of other sources.

In the embodiment illustrated in FIG. 2, the operations applicable to FIG. 1 are still in force and additional operations are added. The controller box 280 drives a portion of the display 240 by providing the entertainment content 270 and/or the advertising content 275.

The entertainment content 270 is provided to the display 240 by a feed from the entertainment content source 295 through the controller box 280. If the entertainment content source 295 includes multiple channels, the actual channel displayed can be controlled either through the controller box 280 or through the controller box 280 operating together with the promotional server 290. In some embodiments, the display 240 may be a touch sensitive screen. In these embodiments, the controller box 280 can also provide control buttons on the display 240 to allow a player to select a particular entertainment content channel, adjust the volume, hide the display, freeze the display, zoom in or out on the display, mute the audio, or the like. In other embodiments, special keys or buttons can be added to the machine, or existing keys or buttons can be redefined to facilitate this functionality.

The advertising content 275 is provided to the display 240 either by a feed from the entertainment content source 295 under the control of the controller box 280 or, from the promotional server 290 under the control of the controller box 280. For advertisement content from the entertainment feed, the operation is similar to that described for the entertainment content. However, for advertising content 275 from the promotional server 290, several innovative capabilities are provided. One such innovative capability is allowing the operator of the video gaming machines 210 to customize promotional events and advertise the promotional events on the display 240 of the video gaming machine 210. Another such innovative capability is enabling the play of the video gaming machine 210 to be monitored in view of the promotional event and control the granting of awards for the promotional event in a closed-loop manner.

The operator of the video gaming machines can customize the promotional events available on the video gaming machines 210 through the use of the promotional server 290. The operator can directly access the promotional server 290 or can access the promotional server through the network 285 from a remote machine 297. In practice, the promotional server 290 executes a software program that provides a programming functionality for promotional events. The actual configuration of the software program can vary between embodiments but in general, the software program includes, but is not limited to the following functionality:

(a) creation of content to display for promotional events;

(b) establishing schedule of promotional events; and (c) driving video gaming machines (Closed-loop Operation).

Creating Content for Promotional Events

Figure 3A:
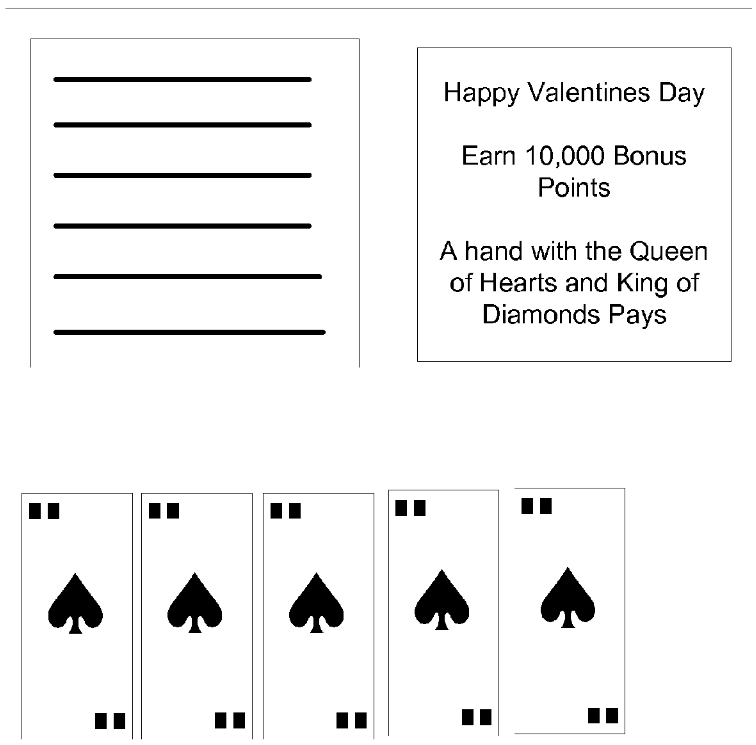
FIG. 3*a*-3*b* illustrate two exemplary displays to advertise a promotional event.
Figure 3B:
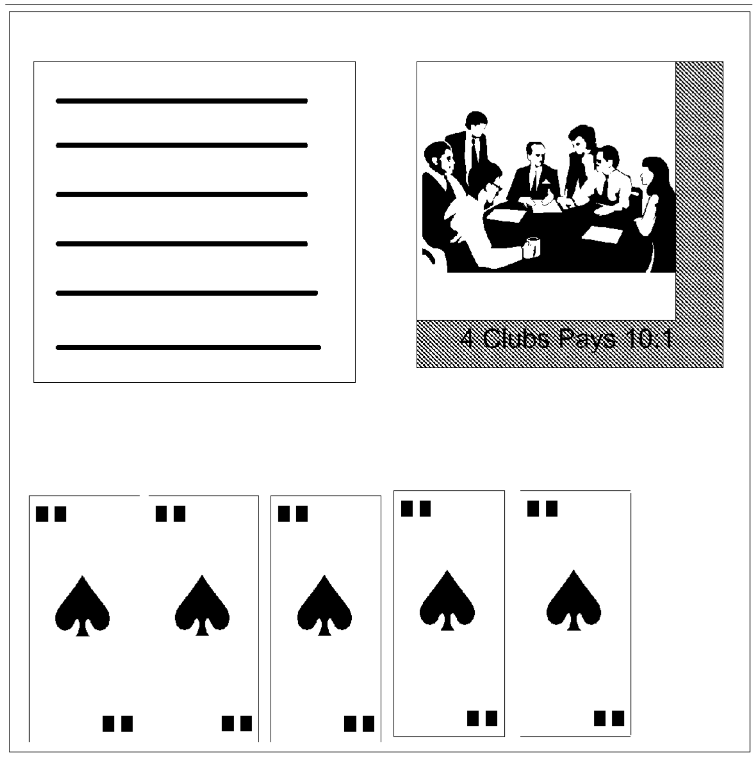

The operator creates content to display for a promotional event. The display of the content can vary from embodiment to embodiment. FIG. 3*a*-3*b* illustrate two exemplary displays to advertise a promotional event. The content could include graphics, text, moving video, audio or a combination of any of these. The promotional server 290 allows the content to be created either utilizing the software program or to be created elsewhere and imported into the promotional server 290. The promotional server 290 maintains a database of the promotional content and the scheduling information. The operator is able to create multiple displays for a variety of promotional events and store them into the promotional server 290 for current use or for later use. FIG. 3*a* shows a display format that encompasses the display area for both the entertainment content 270 and the advertising content 275. FIG. 3*b* shows a display format that encompasses only the display area for the advertisement content 275. Other configurations are also anticipated such as, but not limited to, flashing the entire display 240, scrolling across a portion of the display 240 and encompassing the entire display 240 for a period of time. Once the content has been created, the operator can establish a schedule for the promotional events.

Establishing a Schedule

Figure 4:
FIG. 4 is screen shot illustrating one embodiment of the playlist.

The operator establishes a schedule for the promotional events that can include, among other parameters, the date and time for the event, the duration of the event, and the display content to promote the event. In one embodiment, the schedule is presented in the form of a playlist. Each item in the playlist can be customized and scheduled. FIG. 4 is screen shot illustrating one embodiment of the playlist. The playlist consist of multiple slots (Slot 1-10 in this example) and can be spread out over multiple pages (page 1-6 in this example). In the illustrated embodiment, Slots 2-4 and Slot 6 hold advertising content. Slot 7 has been programmed to hold promotional content. Furthermore, the illustrated embodiment is implemented in mark-up languages and viewable through a standard browser, however, those skilled in the art will appreciate that the particular implementation language and/or technology, as well as the specific formats, look-and-feel and operations of the software program are independent of and not relevant to the particular operations of the described aspects of the present invention. Thus, although the remaining examples will be described as including particular operations that result in particular screen views, the present invention is not limited in such a manner.

To edit or create promotional content, the user selects the applicable Slot X hyperlink. For instance, if an operator desires to create the promotional event that is currently displayed in Slot 7, the operator selects Slot 7 and the resulting display is illustrated in FIG. 5.

Figure 5:
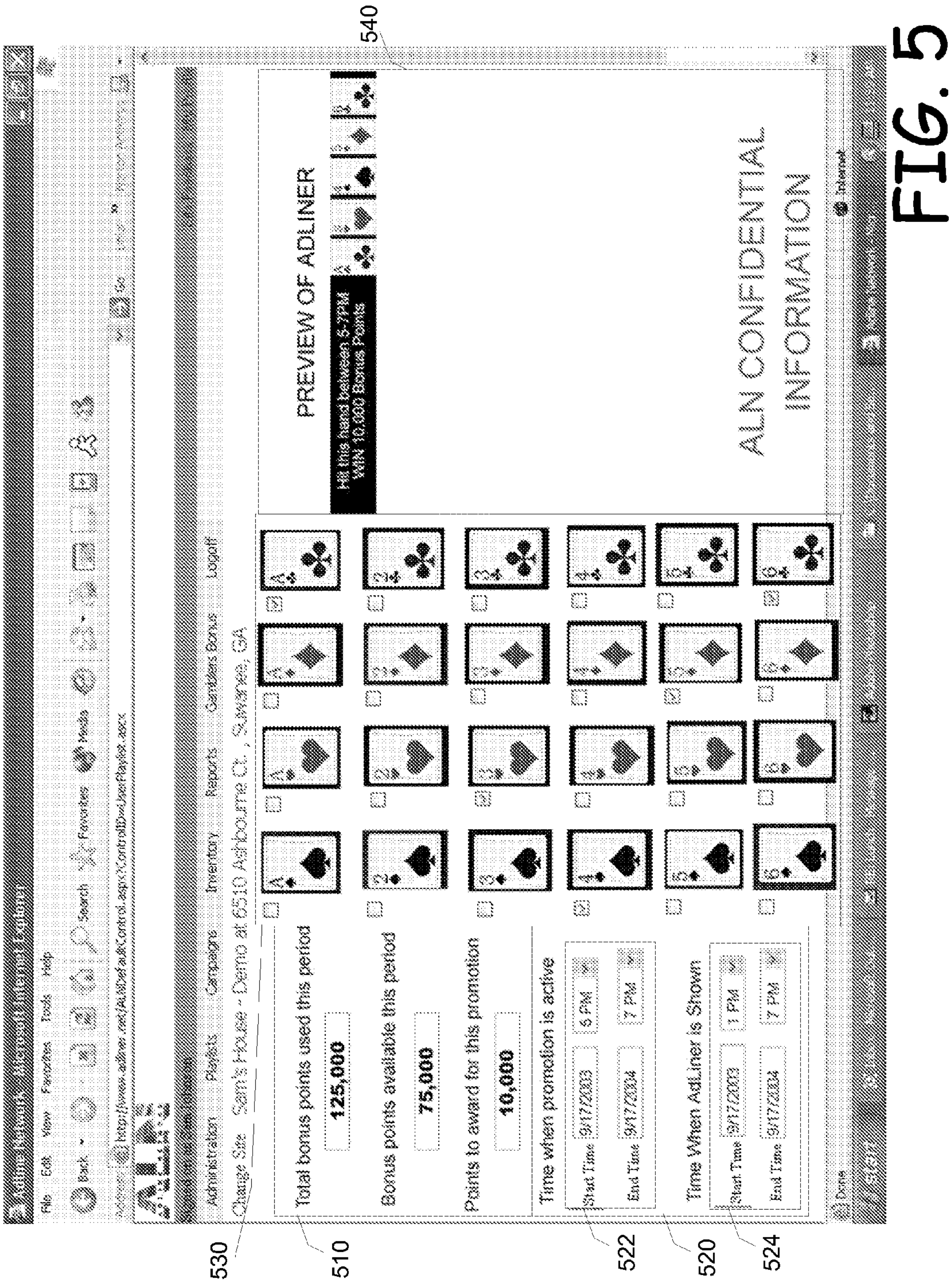
FIG. 5 is a screen shot illustrating the programming screen for promotional content.

FIG. 5 is a screen shot illustrating the programming screen for a promotional event. The programming screen includes a bonus area 510, a scheduling area 520, a promotional definition area 530 and a preview of the promotional content area 540. The bonus area 510 identifies the bonus points that have been awarded during a particular period of time. This feature allows the operator to keep track of the amount of bonus points that have been awarded. It should be appreciated that the bonus points can represent a variety of awards. For instance, in a gambling embodiment, the bonus points may translate directly into monetary units. In a gaming scenario, the bonus points may represent credits for additional play or can be redeemed for prizes. In a charitable situation, the bonus points may translate into bidding power for a silent auction. In a restaurant/bar setting, the bonus points may translate into discounts for food or beverages. It should be appreciated that additional uses could easily be identified for various scenarios. The bonus area 510 also identifies the bonus point available. This may represent the amount of bonus awards that the operator has remaining in his desired budget. For instance, for a particular period, an operator may budget bonus points and the budgeted amount will be the sum of the total bonus points awarded and the bonus points available for this period. The bonus area 510 also includes an editable field in which the operator can select the bonus points that will be awarded for a particular promotional event. In the illustrated embodiment, the operator has selected 10,000 bonus points. In one embodiment, the promotional event can be scheduled to run for a particular period of time and/or until a budgeted amount of bonus points have been awarded.

The scheduling area 520 includes two sub-areas, the promotion active time 522 and the promotion display active time 524. During the programmed promotion display active time, the promotional content identified in the promotional content area 540 will be available for display. During the programmed promotion active time the promotion will actually be in effect. In some embodiments, an additional field can be displayed and edited to allow the operator to select the duration of time that will be dedicated to the slot in which the promotional event is programmed. For example, each programmed slot may be allocated to be 15 seconds and be cycled on the display in a round-robin fashion. Thus, when actual time falls within the programmed display active time for the promotional event, the promotional content will be displayed in a periodic manner. It should be appreciated that priorities could be assigned to particular slots and that varying time frames can be allocated for various slots also.

The promotional definition area 530 allows the operator to define the particular winning criteria for the promotional event. In the illustrated embodiment, the operator has selected the following hand to constitute a win:

A♣3♥4♠5♦6♣.

The operator may also program "don't care" or "wild card" conditions also. For instance, on Valentines Day, the operator may run a promotion in which the following hands constitute a win:

Q♥K♥ (don't care) (don't care) (don't care) or

Q♥ (wild card) (don't care) (don't care) (don't care) where a wild card is any card that is a heart.

Thus, a player that draws the Q♥ and the K♥ or any heart card in any hand during the active time for the promotion would be awarded the bonus points.

The preview of the promotional content area 540 indicates the content that will be displayed during the programmed program display active time. In some embodiments, multiple content formats can be provided and the operator can select from the various formats. In other embodiments, an operator may select multiple formats that can be cycled through or randomly selected during the programmed promotion display time. It should be appreciated that the software program can automatically generate the display content, allow an editing function so that the operator can customize the display content, or allow the operator to import display content created from another application.

Closed-Loop Operation

The present invention also provides for closed-loop operation. The closed-loop operation, in general, allows for the recording of events that satisfy the winning criteria and then reporting the win to the operator in a controlled and secure or reliable manner. Advantageously, this aspect of the present invention helps to reduce or eliminate fraud in the awarding of bonus points to players.

In operation, the controller box 280 interfaces to the processor of the gaming machine 210 and to the promotional server 290. The controller box monitors activity information pertaining to the operation of the gaming machine. Although the gaming machines typically filter out hands that are transmitted over the network 130 to the operator server 120, the gaming machines 210 still include the logic to identify the hands that are not classified as winning hands on the payout table 250. The controller box 280 interfaces with the processor to identify all hands that are dealt.

This aspect of the present invention advantageously enables the monitoring and tracking of a variety of demographic information. For instance, in a video poker game environment, the controller box 280 can monitor and track the operations of a player, such as hands dealt, cards held, cards discarded, etc. This information could be used for a variety of purposes including identifying unsophisticated players that may need to attend a help session or players that are trying to trick the machine.

The present invention also includes the ability for the player to interact with the gaming machine 210 in response to the promotion. For instance, during a promotion, or even during standard play, the present invention can operate to display a message to the player to prompt for an action, and then provide an award based on that action. One example is to display a message directed towards a particular gaming machine 210 or a particular player, or a message directed across multiple gaming machines 210. A typical message could state that the first 50 players to perform a particular task will receive an award. The particular task could be a variety of different tasks, including but not limited to, pressing a certain button on the gaming machine 210, playing an additional round on the gaming machine 210, betting a certain amount, betting a threshold amount for a given number of hands, and cashing in a requested number of bonus points. The award could also be a variety of things, such as a coupon for a $2.00 steak dinner, a 10% discount at the gift shop, or a free round of golf with the purchase of a round. Depending on the particular embodiment, the players responding to the prompt may receive a printed receipt generated by the gaming machine 210, have the coupon recorded onto a magnetic strip of a card, receive a token, be requested to enter identification information into the gaming machine that can later be used to verify the win, or the machine can simply sound a bell or flash a light to get the attention of a game room attendant that can provide the coupon to the player.

In another example, the message may state that a player can exchange points or perform tasks to view pay-per-view content. The response time for performing the task may be restricted (i.e., in the next 5 minutes or immediately) or may be conditional on other attributes such as betting amounts, playing time, or the like. In one embodiment, while the promotional message is displayed, the player can respond by touching the displayed promotion on a touch sensitive screen. A confirmation message will then appear to verify that the player wants to exchange points, or pay for the reception of the pay-per-view content. In one embodiment, the gaming machine can print out a ticket that the player can use to access the pay-per-view content. In another embodiment, the pay-per-view content may directly appear on the gaming machines screen. In this embodiment, the player may be required to meet certain playing thresholds to keep the pay-per-view content on the screen (i.e., minimum number of bets per hour, betting a minimum amount).

Another variation on promotional events that can be implemented in an embodiment of the present invention is a tiered promotion. The tiered promotion requires a player to opt-in to a promotion. In operation, a promotional message is provided to the player indicating that the player can pay an additional fee (i.e. points or money) to win a chance at 10,000 additional bonus points if they meet certain win criteria. Such a promotion could be limited on a per session basis In one embodiment, the promotional server 290 may download into the controller box 280 all of the information regarding the scheduling of advertisements and promotional events. In this embodiment, the controller box 280 operates to control the display and timing of the display. In addition, during the programmed promotion active time, the controller box 280 will monitor for hands that meet the winning criteria. Once a winning hand is identified, the controller box 280 will notify the promotional event server 290 and provide any necessary information such as, but not limited to, the identity of the video gaming machine 210, the identity of the player, the time and date and the particular hand that satisfies the criteria.

In another embodiment, the controller box 280 may operate more similar to a dummy terminal. In this embodiment, the promotional event sever 290 is responsible for controlling the timing and content of the display and continuously downloads the necessary information to the controller box 280. The controller box 280 then controls the actual display of the content onto the display screen 240 of the video gaming machine 210. The controller box 280 then sends information to the promotional event server 290 for every hand that is dealt and the promotional event server 290 monitors the hands to identify when winning criteria has been met.

It should be appreciated that these two embodiments are just two illustrative embodiments as to how the processing power for the closed-loop system can be allocated. Those skilled in the art will appreciate that the actual processing power attributed to the various tasks can be allocated between the controller box 280 and the promotional event server 290 in a variety of fashions and the present invention is not limited to any particular configuration. In fact, all of the functionality can be incorporated into either the controller box 280 or the promotional event server 290 and totally eliminate the need for the other device.

Ultimately, the promotional event server 290 obtains the information necessary to identify the player and the award that has been earned by the player. The operator can extract this information directly from the promotional event server 290, by accessing the promotional event server 290 through the network, or the promotional event server 290 may also include a direct or indirect interface to the operator server 120 over which the promotional event server 290 uploads the information.

Thus, it should be evident that the present invention eliminates the risk of loss associated with the current art in which the operator is dependent upon the integrity of an employee or any other party that would ordinarily be responsible for being approached by a player purporting to have qualified as a winner, who then must physically visit the particular gaming machine 210 to observe the display, and then record the information and report that information back to the operator.

Figure 6:
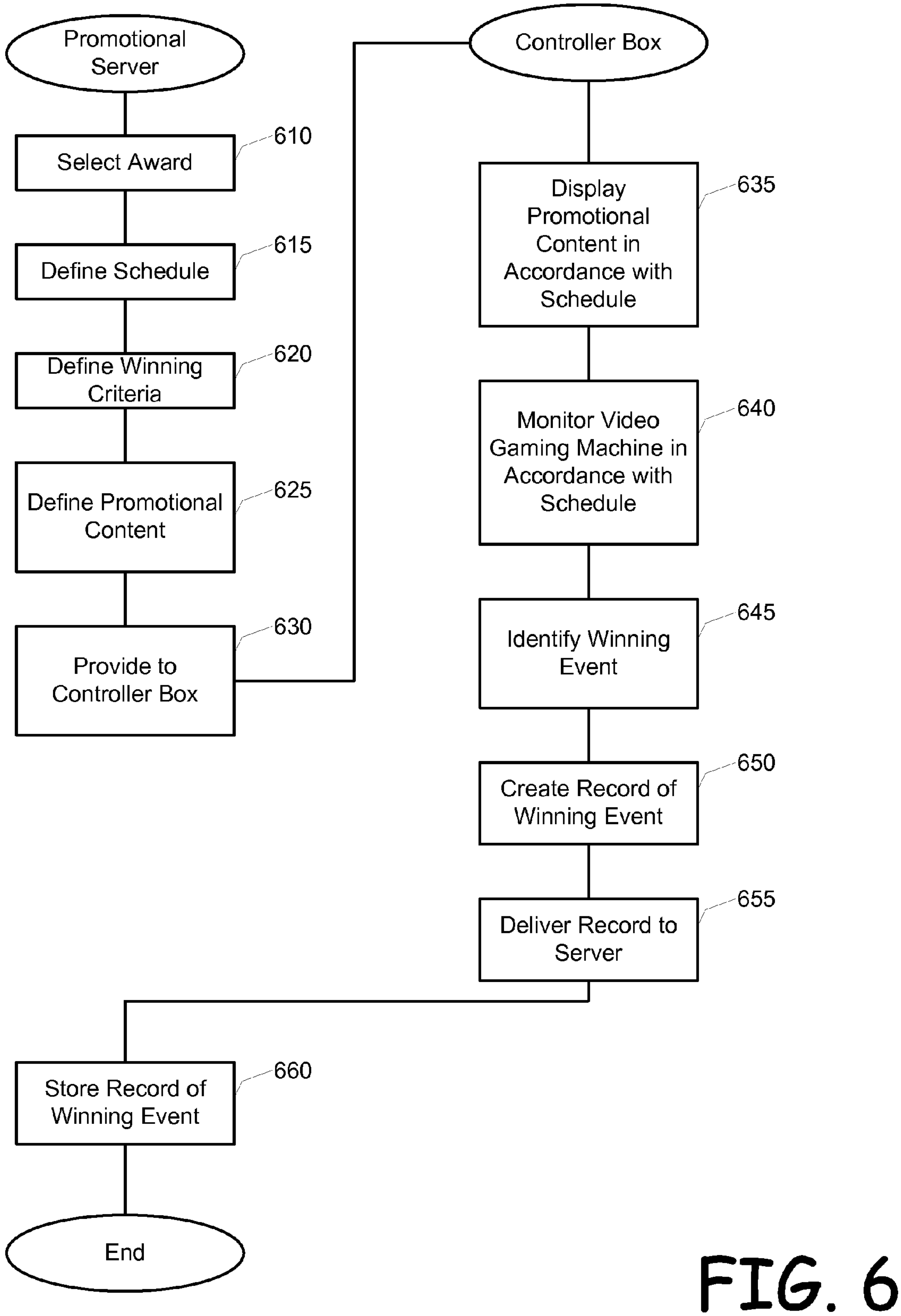
FIG. 6 is a flow diagram summarizing the operations of the promotional server and the controller box.

FIG. 6 is a flow diagram summarizing the operations of the promotional server and the controller box. At step 610, the operator using the promotional server identifies the award to be associated with a new promotional event. At step 615, the operator defines the schedule for the promotional event. The schedule includes at least two components. One component is the time period that advertising content for the promotional event will be displayed. The other component is the actual time period during which the promotional event will be active. In some embodiments these two time periods can be identical thus eliminating the need to program two time periods. At step 620, the operator defines the winning criteria. In the embodiment illustrated in FIG. 5, this step includes selecting the cards to be included in the winning hand. However, this step can vary greatly depending on the embodiment of the invention. For instance, in a restaurant setting, this step may include identifying a menu item. At step 625, the operator defines the promotional content to be displayed for advertising the promotional event. This step could involve importing a graphic or text file from another source or actually defining the art work. At step 630, the information pertaining to the promotional event is provided to the controller box 280.

It should be appreciated that multiple promotional events can be scheduled and loaded into the controller box 280. In fact, multiple promotional events can be concurrently active. The controller box can receive a download of all scheduled promotional events and at step 635, the controller box displays the advertising content pertaining to the promotional events in accordance with the schedule associated with the promotional events. Alternatively, the promotional server may only download information to the controller box when the information is active. At step 640, the controller box monitors the activity of the gaming machine in accordance with the schedule associated with the active time period for the promotional event. At step 645, the controller box 280 identifies that the criteria for a winning event has been satisfied. At step 650, the controller box 280 creates a record regarding the winning event. Depending on the particular embodiment, the content in this record can vary greatly. Typical embodiments will include information such as, but not limited to, the identity of the gaming machine, the identity of the player, the time and date of the winning event, the winning event, the identification of the promotional event, the address of the gaming machine, the location of the gaming machine, etc. In some embodiments, the controller may include a GPS signal receiver that can be used to identify the location of the gaming machine. At step 655, the record is delivered to the promotional server 290.

It should be appreciated that the present invention also enables the reporting of other activity that is not necessarily associated with a promotional event. For instance, the operator may want to establish a maintenance schedule for the equipment based on particular criteria. The present invention can be used to define such criteria and monitor for the satisfaction of the criteria. For instance, such criteria could include events such as hours of usage, number of key presses, number of key presses for particular keys, detection of operating errors, detection of loss of power, or the like.

The present invention could also be used to identify the amount of financial exposure an operator has with his currently running promotions. For instance, if a budget has been set for the promotion, the system can monitor the payouts that have been awarded during the promotional event and, based upon this information the operator or the system can make decisions to limit or expand the duration or winning criteria of the promotion. Likewise, the operator can allocate additional bonus points to the budget, or further limit the budget of a promotional event based on the operator's historical business performance with the promotion.

From the information obtained through the use of various embodiments of the present invention, the success or failures of certain promotions can be analyzed. This analysis can be used to identify particular attributes that may have contributed to the success or failure of the promotion. For instance, the duration of the promotion, the time of day the promotion was run, the date of the promotion, the amount of awards available for the promotion and the winning criteria of the promotion are several attributes that can be monitored and tracked to determine what effect, if any, these attributes have on driving the behavior of the players. As an example, an operator may determine that a particular promotion that runs in the morning may be more likely to generate playing time from players than is generated when the promotion is run in the evening.

The promotional server 290 stores received records at step 660 and maintains a database of records received from the controller box 280. It should be appreciated that the promotional server 290 can support many controller boxes 280 for many different operators. Thus, the promotional server 290 includes a security mechanism to restrict access to records and files. Such security mechanism may be password protection, or may include more advanced security techniques that should be familiar to those skilled in the art.

Operation in Other Settings

Although the present invention has been described with particular reference to a gaming or gambling scenario, the present invention, or aspects of the present invention, may be equally applied in a variety of other settings. For instance, in a restaurant setting, aspects of the present invention can be used to display special events within the restaurant. Thus, if a restaurant owner wants to promote a particular item on the menu, the restaurant owner may program a promotional event to be displayed on monitors within the restaurant. One example of such an event may be that a 20% discount is available to any patrons ordering the chicken fried steak during a particular period of time or day. In the typical restaurant setting, this embodiment is dependent upon accurate reporting by the waiter or waitress, however, in this embodiment; the integrity afforded by the closed-loop system is not as important as in the gambling scenario.

The present invention can also be used for performing management or controlling functions in various environments. For instance, in the restaurant setting again, various criteria can be entered as the basis of "winning events" where the winning events define particular management or control events. For instance, winning events may be defined to monitor inventory levels. In this scenario, if the inventory of a particular item drops below a particular threshold, it may trigger a reorder message. As another example, if the inventory for a perishable item is in stock beyond a certain date or time period, a message can be triggered to identify that item as being expired. As yet another example, the winning event may identify a particular product and the ingredients of that product. In this scenario, a message can be triggered based on the duration that the product should exist on the shelf or be available to patrons prior to the expiration. In addition, a message may be triggered to indicate that the inventory of ingredients to create this product has decreased beyond a particular threshold. Other criteria that can be included in this scenario could be the historical pattern of the pace of selling this product. In each of these scenarios, the generated messages can be displayed on a monitor or sent to a communication device to notify the responsible parties.

The present invention could also be incorporated into a bowling alley scenario. In this embodiment, the controller box 280 interfaces to the scoring control mechanism for the bowling alley. On the individual scoring screens, various promotional events can be displayed, such as, hitting a strike between the hours of 3 pm to 4 pm will award a free game to the bowler.

In the description and claims, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. It will be appreciated that other uses of the present invention are also anticipated. The described embodiments comprise different features, not all of which are required in all embodiments of the invention. Some embodiments of the present invention utilize only some of the features or possible combinations of the features. For instance, the controller box 280 has been described as interfacing to the processor and display of a particular machine. In some embodiments, the display and the processor may be totally independent. And example of such a scenario would be in a setting that the display includes a television or video monitor and the controller box 280 monitors activity of an independent device such as a juke box, trivia machine, point-of-sale terminal or arcade machine. Variations of embodiments of the present invention that are described and embodiments of the present invention comprising different combinations of features noted in the described embodiments will occur to persons of skilled in the art. The scope of the invention is limited only by the following claims.

What is claimed is:

1. A controller for enhancing a standard electronic gaming machine which includes at least one video display, at least one user input and a processing system which generates game information and outputs the game information via a video output for display by the at least one video display, the controller configured to be communicatively coupled to the processing system to cause the at least one video display to display secondary content which is generated independent and apart from the game information which is generated by the processing system of the standard electronic gaming machine, the controller comprising:

a machine interface that communicatively couples to the processing system of the standard electronic gaming machine for monitoring activity of the standard electronic gaming machine;

a display interface configured to cause the at least one video display of the standard electronic gaming machine to display secondary content on a particular portion thereof, independent of the game content generated by the processing system which is separately provided to the at least one video display for display thereby;

a user interface to monitor one or more actuation devices on the standard electronic gaming machine; and a server interface for obtaining secondary content from at least one remote server;

the controller being configured to cause said at least one video display of the standard electronic gaming machine to display content which is different than said game content which is generated in output by said processing system, said content comprising at least said secondary content received from said at least one remote server, monitor the standard activity of the gaming machine and provide the monitored information to the server via the server interface.

2. The controller of claim 1, wherein the controller includes a processing system that is separate from the processing system in the standard electronic gaming machine.

3. The controller of claim 1, wherein the controller includes a processing system that is separate from the processing system in the standard electronic gaming machine but interfaces to the same video display output.

4. The controller of claim 3, wherein the secondary content comprises entertainment feeds obtained from an entertainment source.

5. The controller of claim 3, wherein the secondary content comprises promotional events obtained from a promotional event server.

6. The controller of claim 5, wherein the promotional events are programmable through the promotional server and can be customized and scheduled.

7. The electronic controller of claim 3, wherein the secondary content comprises two components, entertainment feeds obtained from an entertainment source and promotional events obtained from a promotional event server.

8. The controller of claim 7, wherein the controller monitors actuations of the user input interface and renders the entertainment feed component of the secondary content based at least in part on such actuations.

9. The controller of claim 8, wherein the promotional events identify actuations of the user interface and results of such actuations.

10. The controller of claim 9, wherein the results of such actuations relate to the presentation of the entertainment feed component of the secondary content.

11. The controller of claim 9, wherein the results of such actuations augment award output data.

* * * * *

UNITED STATES PATENT AND TRADEMARK OFFICE

CERTIFICATE OF CORRECTION

PATENT NO. : 8,784,213 B2
APPLICATION NO. : 11/968633
DATED : July 22, 2014
INVENTOR(S) : Sam Johnson It is certified that error appears in the above-identified patent and that said Letters Patent is hereby corrected as shown below:

IN THE CLAIMS

In Claim 1, Column 16, Line 12, between “display” and “secondary” insert --the--.
In Claim 1, Column 16, Line 13, replace “content” with --information--.
In Claim 1, Column 16, Line 18, between “obtaining” and “secondary” insert --the--.
In Claim 1, Column 16, Line 23, replace “content” with --information--.
In Claim 1, Column 16, Line 23, replace “in” with --and--.
In Claim 1, Column 16, Line 27, between the second instance of “the” and “server” insert --at least one remote--.
In Claim 3, Column 16, Line 35, between “same” and “video” insert --at least one--.
In Claim 3, Column 16, Line 35, delete “output”.
In Claim 6, Column 16, Line 43, between “promotional” and “server” insert --event--.
In Claim 8, Column 16, Line 50, delete “input”.
In Claim 10, Column 16, Line 56, delete the second instance of “the”.
In Claim 10, Column 16, Line 57, delete the first instance of “the”.
In Claim 11, Column 16, Line 29, delete the second instance of “the”.

Signed and Sealed this
Second Day of June, 2015

Michelle K. Lee

Michelle K. Lee
*Director of the United States Patent and Trademark Office*